July 26, 1927.
S. M. VAUCLAIN
1,637,287
DRIVING WHEEL FOR LOCOMOTIVES, ETC
Filed June 16, 1927
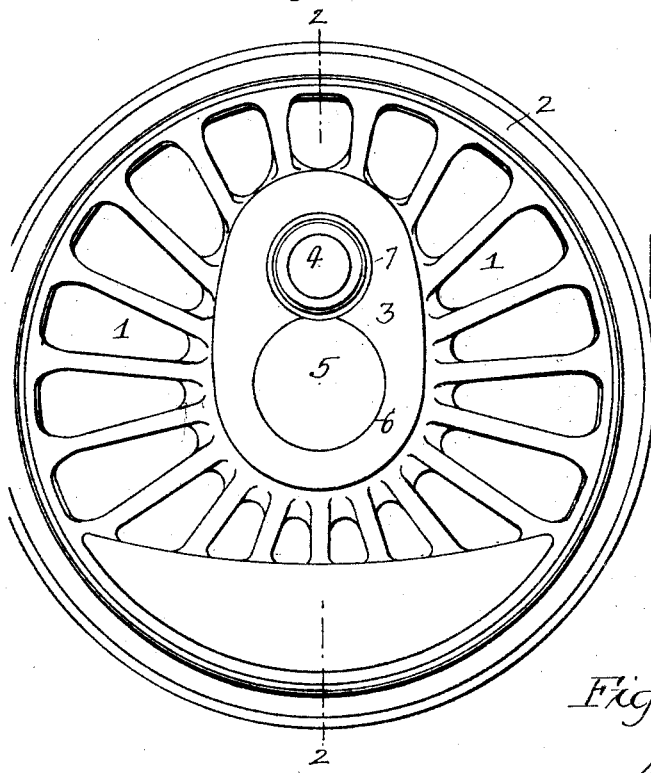
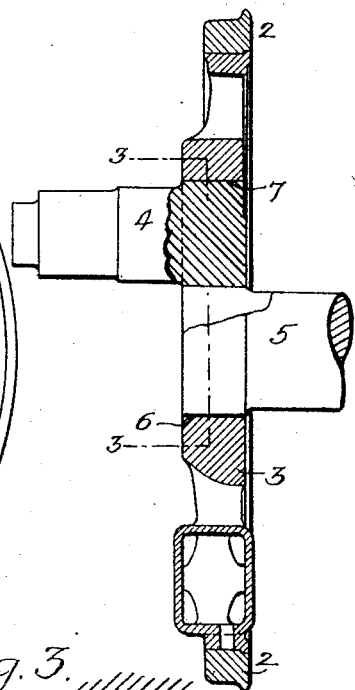
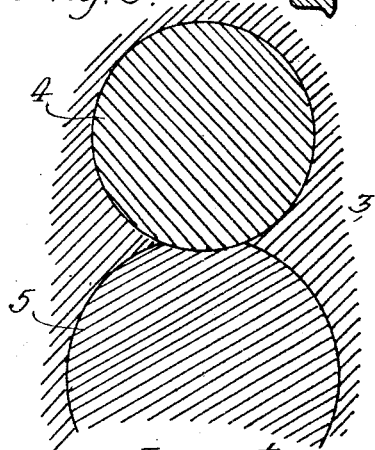
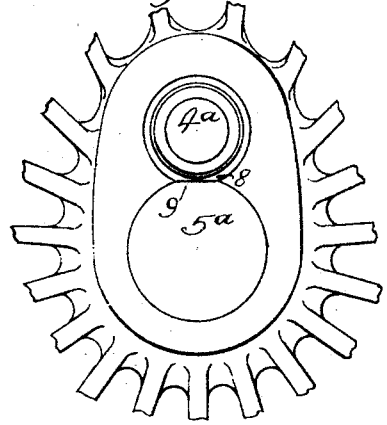
Inventor:
Samuel M. Vauclain
by his Attorneys
Howson & Howson Patented July 26, 1927.

1,637,287

UNITED STATES PATENT OFFICE.

SAMUEL M. VAUCLAIN, OF ROSEMONT, PENNSYLVANIA.

DRIVING WHEEL FOR LOCOMOTIVES, ETC.

Application filed June 16, 1927. Serial No. 199,319.

My invention relates to certain improvements in the driving wheels of locomotives, and particularly the main driving wheel which carries the large driving pin.

The object of the invention is to so construct the driving wheel that the axle and the driving pin will interlock.

A further object of the invention is to so design the wheel that the large driving pin can be used without diminishing the size of the axle.

In the accompanying drawing:

Fig. 1 is a face view of a locomotive driving wheel embodying my new invention;

Fig. 2 is a section on the line 2—2, Fig. 1;

Fig. 3 is a sectional view on the line 3—3, Fig. 2, drawn to a scale larger than that shown in Fig. 1; and Fig. 4 is a view illustrating a modification of the invention.

1 is the centre of a driving wheel having the ordinary tire 2. 3 is the hub of the wheel enlarged at one side as shown to receive the driving pin 4. 5 is the axle which is adapted to an opening in the hub 3.

The stroke of a locomotive, as well as the power, has increased to such an extent that it is necessary to provide enlarged driving pins and enlarged axles. Consequently, the usual practice of providing a web between the opening for the driving pin and the opening for the axle had to be discarded.

In order to retain the necessary proportions and to provide sufficient strength for the parts, the hub 3 is enlarged as shown in Fig. 1, and an opening 6 is provided for the axle 5 which cuts into the opening 7 for the base of the pin 4.

The wheel is driven on the axle 5 as shown. Then the opening 7 is reamed out, cutting away that portion of the axle extending within the line of the opening for the pin, after which the pin 4 is driven in its opening 7, a portion of the pin engaging or interlocking with the recessed portion of the axle. Thus a pin of the proper diameter is used, which also acts as a key for the axle 5. In some instances the axle 5 may be of full diameter and the pin may be recessed on one side to receive the projecting portion of the axle.

In Fig. 4 I have shown a modification, in which the pin and the axle have flattened surfaces 8 and 9. respectively, which, when the axle 5ª and the pin 4ª are driven into position, abut, so that one element will not turn in respect to the other.

By the above constructions, the desired stroke is attained without weakening the crank pin and the axle, nor is the hub of the wheel weakened thereby.

I claim:

1. The combination in a driving wheel for locomotives, etc., of a hub in which are openings for the axle and the driving pin, the openings being connected; an axle and a driving pin driven into the respective openings and engaging one with the other.

2. The combination of a locomotive driving wheel having an axle opening and a crank pin opening, the two openings being connected; an axle driven into its opening in the wheel and cut away on a line with the walls of the opening for the pin; and a cylindrical crank pin driven into its opening and interlocking with the axle.

SAMUEL M. VAUCLAIN.